United States Patent
Zach

(10) Patent No.: US 8,141,008 B2
(45) Date of Patent: Mar. 20, 2012

(54) OPTICAL LITHOGRAPHY CORRECTION PROCESS

(75) Inventor: Franz Xaver Zach, Los Gatos, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 12/971,845

(22) Filed: Dec. 17, 2010

(65) Prior Publication Data

US 2011/0154281 A1 Jun. 23, 2011

Related U.S. Application Data

(62) Division of application No. 11/101,872, filed on Apr. 9, 2005, now Pat. No. 7,882,456.

(51) Int. Cl.
*G06F 17/50* (2006.01)

(52) U.S. Cl. .......................................... 716/54; 716/51
(58) Field of Classification Search .................. 716/51, 716/54

See application file for complete search history.

(56) References Cited

U.S. PATENT DOCUMENTS

| | | | |
|---|---|---|---|
| 2003/0140329 A1* | 7/2003 | Ogawa et al. | 716/19 |
| 2005/0132306 A1* | 6/2005 | Smith et al. | 716/1 |
| 2005/0153217 A1* | 7/2005 | Izuha et al. | 430/5 |

* cited by examiner

*Primary Examiner* — Suresh Memula
(74) *Attorney, Agent, or Firm* — Kenyon & Kenyon LLP

(57) ABSTRACT

A apparatus and method for correcting a process critical layout includes characterizing the influence of individual ones of a set of worst case process variations on a simulated nano-circuit layout design and then correcting layout geometries in the simulated nano-circuit layout based on such characterizations.

20 Claims, 10 Drawing Sheets

OPTICAL LITHOGRAPHY CORRECTION PROCESS

RELATED APPLICATION

This application is a divisional of and claims the benefit of U.S. patent application Ser. No. 11/101,872 filed Apr. 9, 2005, and issued as U.S. Pat. No. 7,882,456.

BACKGROUND OF THE INVENTION

1. Background of Prior Art

As optical lithography attempts to print smaller and smaller features relative to the wavelength of light used for imaging, the extent to which optical proximity correction techniques modify the original layout has dramatically increased. Concomitantly, the impact of erroneous corrections has also increased leading to circuit failures and, therefore, delays in the delivery of the final microcircuit. Therefore, there is a strong desire to check the validity of the optical proximity corrections before committing a corrected layout to the mask manufacturing process. This need has resulted in the creation of optical rule checking (ORC) techniques. These techniques validate the final result of the optical proximity correction by comparing the predicted images to the original layout. This process has greatly helped minimize delays in the nano-circuit fabrication as potentially fatal errors are detected much earlier then was previously the case. Unfortunately, these techniques do not provide any help in actually resolving the issues raised and, thus, still cause delays and increase manufacturing costs. This led to the realization that a new and improved ORC technique would be highly desirable.

2. Brief Summary of the Invention

An apparatus and method for correcting a process critical layout includes characterizing the influence of individual ones of a set of worst case process variations on a simulated nano-circuit layout design and then correcting layout geometries in the simulated nano-circuit layout based on such characterizations.

BRIEF DESCRIPTION OF THE DRAWINGS

The above mentioned features and steps of the invention and the manner of attaining them will become apparent, and the invention itself will be best understood by reference to the following description of the preferred embodiment(s) of the invention in conjunction with the accompanying drawings wherein.

DETAILED DESCRIPTION OF THE PREFERRED EMBODIMENTS OF THE INVENTION

Figure 1:
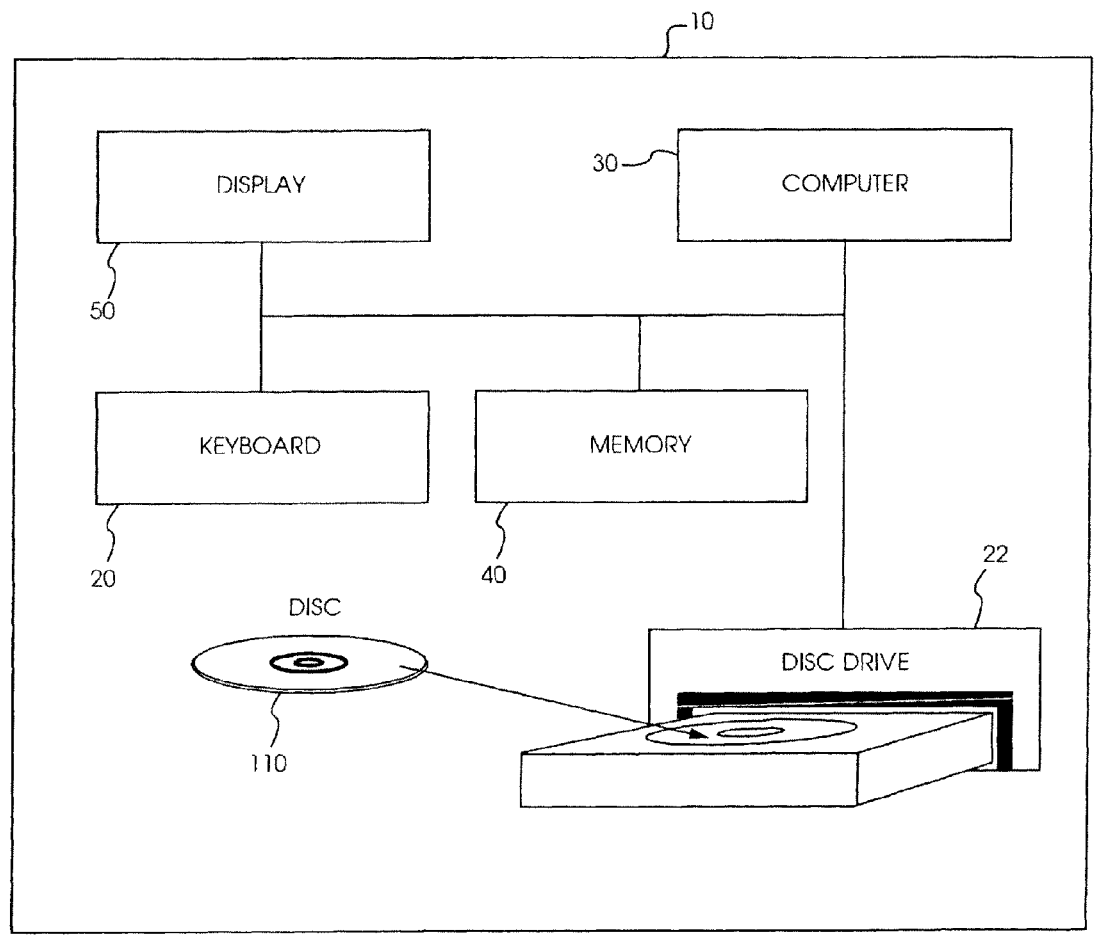
FIG. 1 is a diagrammatic illustration of a computer-aided design system, which is constructed in accordance with an embodiment of the present invention.
Figure 12:
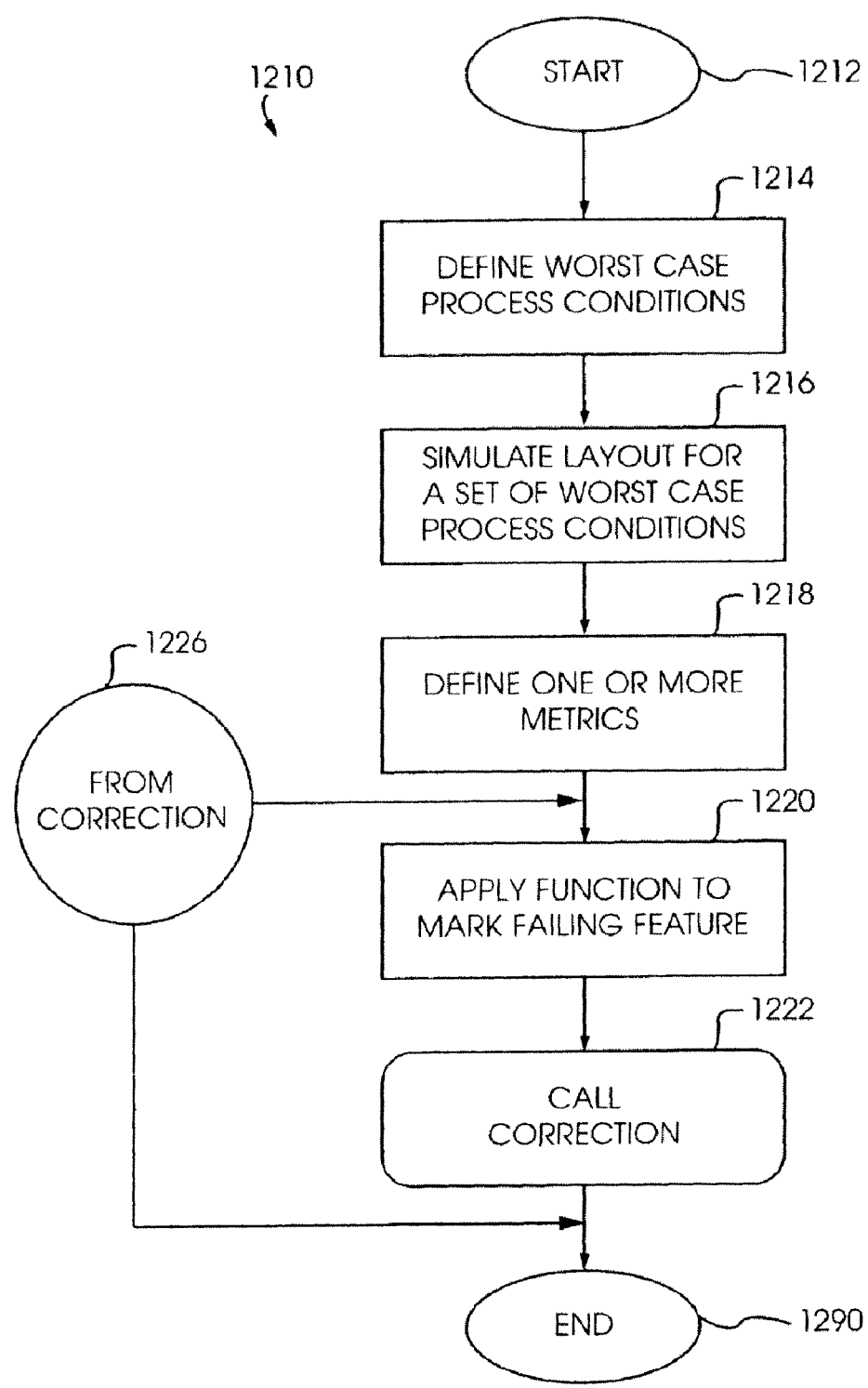
FIG. 12 is a generic process flow diagram for detecting and resolving issues associated with nano-circuit layout configurations that may lead to reduced yields.

Referring now to the drawings and more particularly to FIGS. 1 and 12, there is illustrated a computer-aided design (CAD) system 10, which is constructed according to one of the preferred embodiments of the present invention. In this embodiment, the CAD system 10, through a computer readable program product 110, implements a resolution enhancement technique 1210 (FIG. 12) in an optical lithography process. More particularly, through an optical rule checking (ORC) process, the resolution enhancement technique 1210 verifies whether a distorted mask solution in fact creates the necessary effects to significantly reduce the risk of pattern failures in the printing process, and effectively increase the throughput of a nano-circuit production run when utilizing silicon wafer features having size dimensions significantly smaller than the wavelength of light. In this regard, the resolution enhancement technique 1210 characterizes the influence of individual ones of a plurality of worst case process variations on a simulated nano-circuit layout design and then in response to such characterizations automatically corrects the simulated nano-circuit layout design to create a desired mask design which results in a high yield nano-circuit production run.

Figure 13:
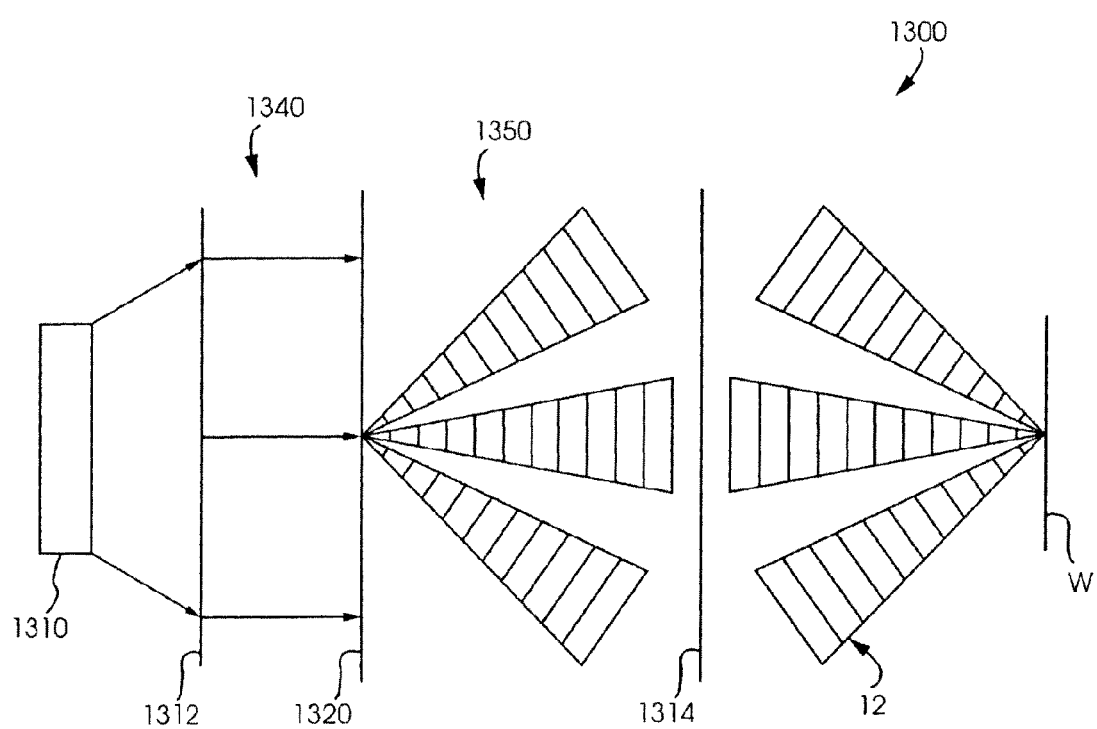
FIG. 13 is a diagrammatic illustration of a fixed pattern mask creating diffracted beams of light.

Before discussing the preferred embodiment of the present invention in greater detail, it may be beneficial to briefly review the theory and practicalities of subwavelength optical lithography with reference to a basic projection lithography system 1300, as illustrated in FIG. 13. With reference to this lithographic process, a condenser lens 1312 distributes the light 1340 from a high intensity lamp or light source 1310, onto a mask or reticle 1320. The mask 1320, in turn, allows the light to selectively pass through based upon its design features, which contain patterns that must be formed on a semiconductor wafer, such as the semiconductor wafer W. In order to bring the light passing through mask 1320 into focus of the semiconductor wafer W, a focusing tool or projection optics 1314 is disposed between the mask 1320 and the semiconductor wafer W.

Optical systems, such as the optical system 1300, cannot image arbitrarily small feature sizes due to the fact that the light utilized for imaging has a finite wavelength. A common way of assessing how far a lithographic process reaches into the sub wavelength domain is to use the so-called k1 factor as shown immediately below. The k1 factor of a technology is determined by the exposing wavelength λ of the light source 1310, the numerical aperture NA of the projection optics 1314 and the half pitch d of a feature size as follows:

$$k_1 = d\frac{NA}{\lambda}$$

The k-factor is a process and system dependent variable that includes process affects such as reticle characteristics, the light source, process improvements and resist. The smallest possible $k_1$ value that can be achieved in an optical system is $k_1$=0.25, typically for advanced processes used in the nano-manufacturing domain this factor is of the order of 0.3 to 0.35.

Referring again to FIG. 13, the underlying physics of equation 1 is depicted. That is, a mask pattern with a fixed pitch p when illuminated with coherent light 1340 creates a series of diffracted beams shown generally at 1350. The diffraction angles α of the beams are given by the following:

nλ=p sin α where n can be any integer number

From the preceding it should be understood that: 1) the diffraction angles α increase with decreasing pitch p; and 2) the lens 1314, which has a finite numerical aperture NA, refocuses the diverging beams to form an image resulting from the interference of these diffraction orders. In this regard, if the numerical aperture NA of the lens is too small to capture the diffracted beams corresponding to n=±1, the resulting images carry no spatial modulation and if the diffracted beams do not pass through the lens 1314, no image is formed on the wafer W. Stated otherwise, as the pitch of the mask pattern is decreased, the diffraction orders occur at higher and higher angles. As a result, larger portions of the first order-diffracted light cannot pass through the lens 1314, which results in degradation in imaging performance.

From the foregoing, it should be appreciated by those skilled in the art that as the demands on lithographic processing increase and approach the limitation barrier of $k_1$=0.25, next generation approaches must be modified to meet this challenge by providing a successful semiconductor process in the new nano-circuit technology arena. The following will disclose a novel process for meeting this challenge.

A successful semiconductor process is characterized by small variations in circuit performance under normal operating conditions of the wafer-manufacturing site. This may be accomplished by 1) selecting processes that exhibit reduced sensitivities to process variations, 2) implementing tighter control of process tools, 3) implementing better quality control processes, or 4) adopting a combination of the three. With respect to these avenues of choice, photolithography processes and more particularly resolution enhancement techniques have emerged as key enablers in reducing sensitivities to process variations. While photolithography tools and processes have improved the success of semiconductor production, it would nevertheless be highly desirable to have a new and improved process that corrects process variations in the manufacturing environment, which in turn, greatly improves the success of semiconductor production. As will be described hereinafter in greater detail, the preferred embodiment of the present invention addresses and solves how to evaluate distorted mask patterns and their effects on electrical performance in a resulting wafer produced under worst-case processing conditions.

Before describing the methodology of the preferred embodiment of the present invention that corrects for process variations under worst-case conditions, it may be helpful to first consider some of the more significant process variations that may result in deviations that significantly affect the success of a semiconductor manufacturing process. Such process variations as related to the lithographic process include: dose conditions, prior patterning steps, differences in wafer materials, variations in wafer topography, illumination system variations, aberrations in the projection lens, focusing system variations, exposure tool flare, reticle variations, mask critical dimensions and the resist characteristics to name the more important ones. Each of these process variations, either alone or in combination, may lead to unwanted and undesired performance degradations or even catastrophic failures.

As the feature dimensions in state-of-the-art microelectronic circuits have dropped below the wavelength of light used in the pattern transfer process the challenges facing the semiconductor manufacturing process have increased dramatically. The projection lenses used to transfer the mask image onto the wafer no longer provide a perfect reproduction of the initial features, rather a variety of image distortions such as corner rounding, line-end-foreshortening and variations in line width as a function of spacing between occur. To counteract these identified problems it has become common practice in the field to pre-distort the patterns on the mask relative to the original design in an effort to counteract the low fidelity of the pattern transfer process. This procedure is commonly referred to as optical proximity correction or simply OPC. At its core OPC is a software algorithm that modifies the original design shapes. This modification is intended to counteract the distortions encountered during the patterning process. As the complexity of these algorithms has grown the desire to verify if the resulting shapes indeed create the desired wafer image has steadily grown. Therefore, software developers have devised optical rules checking (ORC). Originally ORC checked for relatively simple geometrical constraints on the post OPC layout in order to detect potentially failing geometries. In addition these techniques originally evaluated the performance of the resulting post OPC layout under best process conditions. ORC checks for compliance of the predicted wafer image to the original design and therefore, it also detects catastrophic failures. A catastrophic failure is a situation where the image quality has degraded to the point that the circuit no longer performs its intended function. An example could be two patterns, separated by a small gap where the predicted wafer image shows bridging across the gap. In this case, the two pieces originally separated electrically are now connected, a situation that may cause complete failure of the circuitry. Relative to these original capabilities several improvements have been disclosed that will now be discussed.

A work entitled, "Failure Prediction Across Process Window for Robust OPC" by S. D Shang et al. (Proc. SPIE Vol. 5040, p. 431) discloses a methodology for detecting potentially failing geometries. In this work test patterns printed on a wafer are evaluated with respect to certain image failure modes (bridging, opens, line collapse). The pass-fail information from these test patterns is then mapped into a parameter space described by aerial image parameters. Within this parameter space a contour is established that separates failing geometries from those that are printing properly.

J. Belledent et al. in his work entitled, "Critical'Failure ORC" (Proc. SPIE, Vol. 5377, p 1184) presents a continuation of the work prepare by S. D. Shang et al. More particularly, in this continuation work the data used in the failure model calibration also includes data taken at a set of dose and focus conditions.

T. Kotani et al, in his work entitled, "Yield Enhanced Layout Generation by New Design for Manufacturability Flow" (Proc. SPIE Vol. 5379, p 129) discloses a methodology in which a layout is simulated under a variety of process conditions. The information obtained is used to refine the ground rules; however, no attempts are made to define critical metrics or propose in situ layout fixes.

The most significant issues with current approaches to layout checking are a lack of solid methodologies for determining worst case process conditions, lack of suitable metrics to define the process criticality of a layout and finally the inability to address failure locations in an automated fashion.

For a better approach to determining worst-case process conditions it is important to understand the significance of process variations for the semiconductor manufacturing process. This point has been discussed in detail in Chapter 3 of "Nano CMOS Circuit and Physical Design" by B. Wong et al, Wiley, 2004. As noted earlier, a high yielding semiconductor process is characterized by small variations in circuit performance under normal operating conditions of the wafer-manufacturing site. This may be accomplished through tighter control of process tools, tighter quality control, by selecting processes that exhibit reduced sensitivities to process variations or a combination of the three. Focusing on the lithography process, a common technique for reducing sensitivities is to apply resolution enhancement techniques such as sub resolution assist features or phase shift masks (for a detailed discussion see for example A. K Wong, "Resolution enhancement techniques in Optical Lithography", SPIE Press 2001). Sub resolution assist features are geometries not originally present in the layout. Such features are added to enhance the imaging performance of the layout and thus, reduce the sensitivity of the layout to process variations. In addition they are small enough (thus the term sub resolution) hence, they do not appear in the final printed image on the wafer.

Unfortunately, usage of these features increases the data volumes that have to be transferred to the mask manufacturing process and thus, increases data handling time. In addition, larger data volumes result in prolonged mask writing times, which in turn increases mask costs as fewer masks can be manufactured on fairly expensive mask writing tools. This also reduces the mask yields as longer write times increase the probability for tool drifts. It is therefore advantageous to selectively deploy these techniques.

While the detrimental effects of such process variations are well known to those skilled in the art (See for example, Chapter 4 of "Nano-CMOS Circuit and Physical Design", by Ban P. Wong et al, John Wiley & Sons, Inc., ISBN 0-471-46610-7, 2004), current approaches to layout checking lack solid methodologies for determining worst case processing conditions, lack suitable metrics, which define the process criticality of a layout, and finally they lack the ability to address failure locations in an automated fashion. The disclosure that follows will illustrate a new approach, which fully considers worst case processing conditions.

Considering now the CAD system 10 in greater detail with reference to FIG. 1, the CAD system 10 is utilized to translate conventional circuit elements in a microcircuit design file into physical layout design files that are indicative of the desired microcircuit design. In this regard, the CAD system 10 includes: 1) input devices, such as a keyboard 20 and a DVD-R/W drive 22 for entering the desired circuit layout information into the system 10; and 2) a programmable microprocessor 30 which receives signals from the input devices 20 and 22 respectively for translating their input signals, via a conventional CAD program, into signals indicative of the desired layout design files. The layout design files, which describe the desired microcircuit design on a level-by-level basis, starting at the lowest level indicative of transistors and resistors for example, and moving up to those higher levels that interconnect signal transmissions between the various electrical components on a layer-by-layer basis for example, are then temporarily stored in an associated memory system 40. In order to view the physical attributes resulting from the layout design files, the CAD system 10 also includes a display unit, such as the display unit 50.

Referring now to the drawings and more particularly to FIG. 12, the inventive method of optical rules checking is illustrated in a step-by-step process 1210, which begins at a start step 1212. As the process is initiated it progresses to a command step 1214, which requires that each individual one of the worst-case process conditions be defined. More particularly, in a first approximation, a semiconductor manufacturing process is described by a set of nominal conditions. For example, the dose with which a layer is exposed, the temperature of the etch chamber, and the desired critical dimension of a feature are illustrative of such nominal conditions. Even though nominal parameters are important, it is even more crucial to know the spread around these nominal parameters that occur during normal operations. There is also a difference in the spread of the macroscopic parameter (for example, the exposure dose on a lithography tool) and the microscopic parameter (the dose locally delivered to an individual device). These differences occur due to the fact that additional mechanisms contribute to the spread on a microscopic scale, a point that we will return to later.

The significance of variations in process parameters is that they are the source of changes in the intended performance of a circuit. There are various approaches to specifying the intended circuit performance. Intended circuit performance may be specified in terms of the desired shape of features on the wafer or as values for specified electrical performance characteristics such as resistivities for electrical wires and contacts, leakage currents for devices or delay times in circuits.

Examples of process parameters relevant to the lithography process are dose, focus, mask critical dimension (CD), aberrations, the shape of the illuminator, resist characteristics, and exposure tool flare to name some of the more important ones. Each time a feature is printed on the wafer the state of the printing process is characterized by a specific value for each one of these parameters. If one were to sample a large number of features, over a significant period of time, on different chips, different wafers, exposed on different exposure tools probability distributions emerge. These distributions describe the likelihood with which a specific value for a process parameter occurs. While the goal of process control is to minimize the spread of these distributions the spread cannot be completely eliminated. Typically however certain tolerance levels can be maintained.

Dose variations may be due to variations in the delivered dose as well as variations in the effective dose within the resist. Fluctuations in the dose as delivered by the exposure tool arise from non-uniform dose distribution across the exposure slit. Typically these variations are in the range of a few percent. They arise, as the illuminator may not be able to create homogeneous light distribution across the exposure field. Other dose variations arise from dose control issues. Modern lithography tools obtain their light from pulsed excimer lasers. These lasers exhibit pulse-to-pulse intensity variations that result in small dose variations while the exposure tool is scanning.

Variations in the effective dose within the photosensitive resist arise from fluctuations for example, in thickness of the layers below the resist coating. For example, chemical-mechanical polishing processes result in thickness variations of dielectric layers across the wafer. Also, local topography as it occurs in gate processing due to the graininess of the polysilicon may result in thickness variation of the antireflective coating. Varying reflectivity may be caused by, for example, uniformity issues of the exposure tool, dose control issues, reflectivity variations from the underlying substrate or thickness variation in resist caused by wafer topography.

Flare is the effect whereby stray light reaches the resist. Variations of flare occur on length scales large relative to the size of the features being printed and therefore may be considered as an additional, relatively uniform background dose added to the image, Flare variations may occur on length scale ranging from several icrometers to several millimeters.

Focus variations may be driven by across field focal plane deviation, variations in focus leveling, chromatic aberrations and insufficient (or incorrect) corrections to lens heating. Mask critical dimensions may vary due to across plate CD variations as well as variations in the average CD of the mask. The latter are caused by the limited process control of the mask manufacturing process.

Figure 2A:
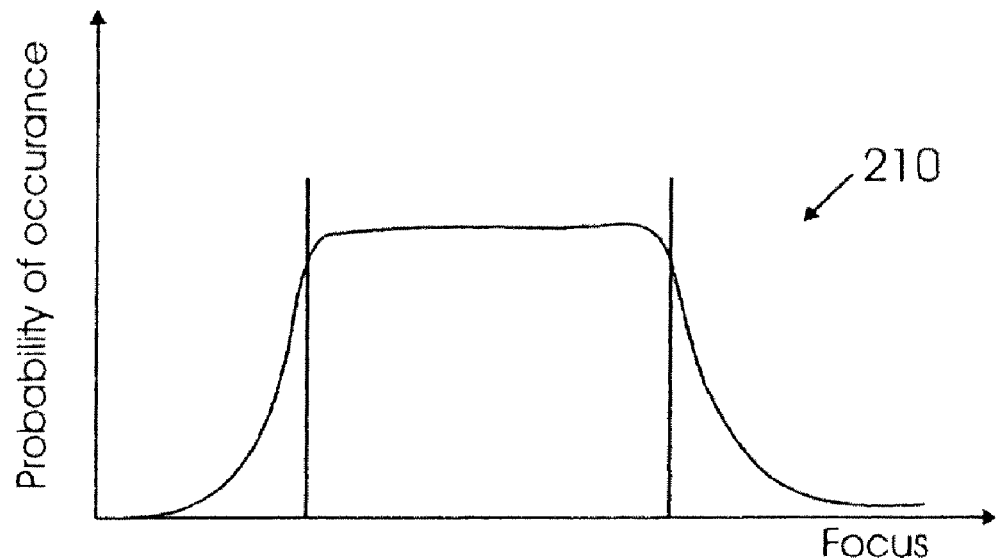
FIGS. 2A-B are example probability distribution curves of the effective focus setting of features printed with an exposure tool where the average focus setting is controlled within certain limits.
Figure 2B:
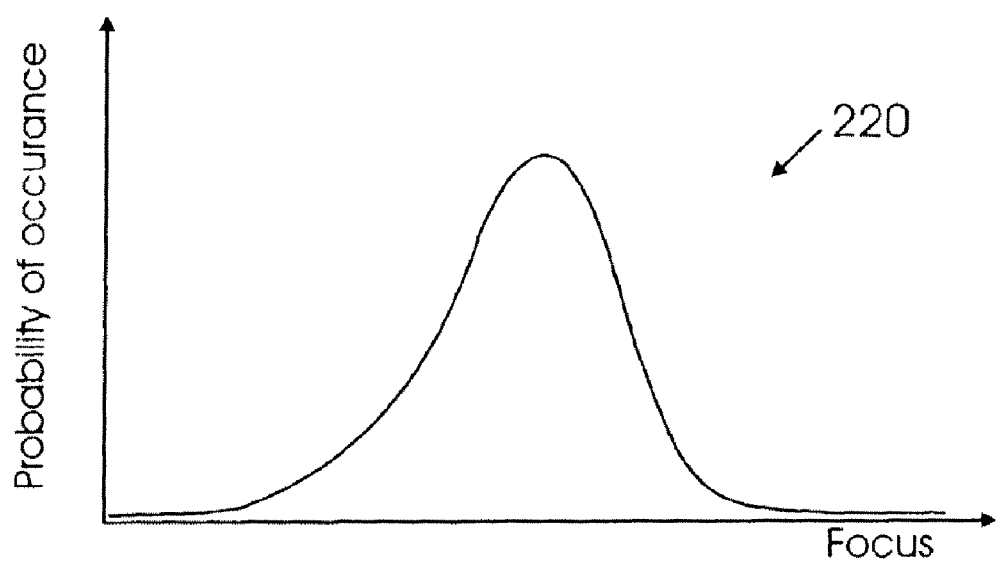

Examples of distributions are shown in FIGS. 2A and 2B. FIG. 2A shows a hypothetical distribution example 210 in which the average focus setting of an exposure tool is controlled within certain limits. This control may be achieved by running a focus monitor which results in tool adjustments if the readings lie outside the control limits. If the process shifts uniformly, the result is a more or less uniform distribution of focus lithographic process parameters. Average focus is allowed to drift over a certain control range. The smearing at the edge of the distribution is due to errors caused by wafer flatness, focal plane deviations and random leveling errors.

FIG. 2B shows a focus distribution 220 for an essentially randomly varying process with some asymmetries in the distribution introduced by across field focal plane deviations.

Lens aberrations characterize less than perfect imaging performance of a lithographic projection lens. Typically variations in lens aberrations occur as variations across the exposure field or as variations from one exposure tool to another one. They may vary over time even though this may occur over relatively long periods.

Masks are produced using lithographic processes and as such are subject to similar variations as those experienced by other lithographic processes. These variations manifest themselves as across mask CD variations, deviations in the CD's of horizontal and vertical lines, and deviations in nominal value, for example caused by changes in the pattern density across the mask field.

Resist processes have significant impact on imaging performance. Variations in resist performance occur as a result of variations in the thermal processing of the resist as well as variations in the develop processes. Non-uniformities of the bake plates used for the post exposure bake cause variations in the diffusion length of the resist, which in turn impact the difference in printed dimension of an isolated vs. a nested line typically referred to as iso-nested offset. Develop time as well as the temperature of the developer modify the effective develop rate, which in turn results in variation in critical dimensions on the wafer.

Besides variations in the integrated light intensity delivered by the illuminator 1310 (FIG. 13) to the reticle 1320 other characteristics of the illuminator 1310 may vary contributing to line width variations. For example, the angular distribution of light from an illuminator may vary from one field location to another resulting in changes of iso-nested offset. Similar to aberrations, these distributions typically change as a function of field location for a given scanner, from scanner to scanner, and may exhibit long-term drifts. Typically these variations are not random.

In spite of all the variations discussed, the features printed on the wafer W are expected to print within certain tolerances. The most stringent requirements are typically defined through electrical performance criteria such as variations in resistivity, signal delay through a MOS gate and other similar parameters.

In accordance with the methodology of defining the worst-case process conditions in step 1214, probability distributions for certain critical process parameters are determined. For example, the variations in effective dose and focus conditions may be determined using a test pattern consisting of an isolated line, a nested line and an isolated space. Each one of these features exhibits its own characteristic change in critical dimension as a function of dose and focus values. For example, the width of the space increases with increasing dose, whereas the width of both types of line features decreases with increasing dose.

Figure 3:
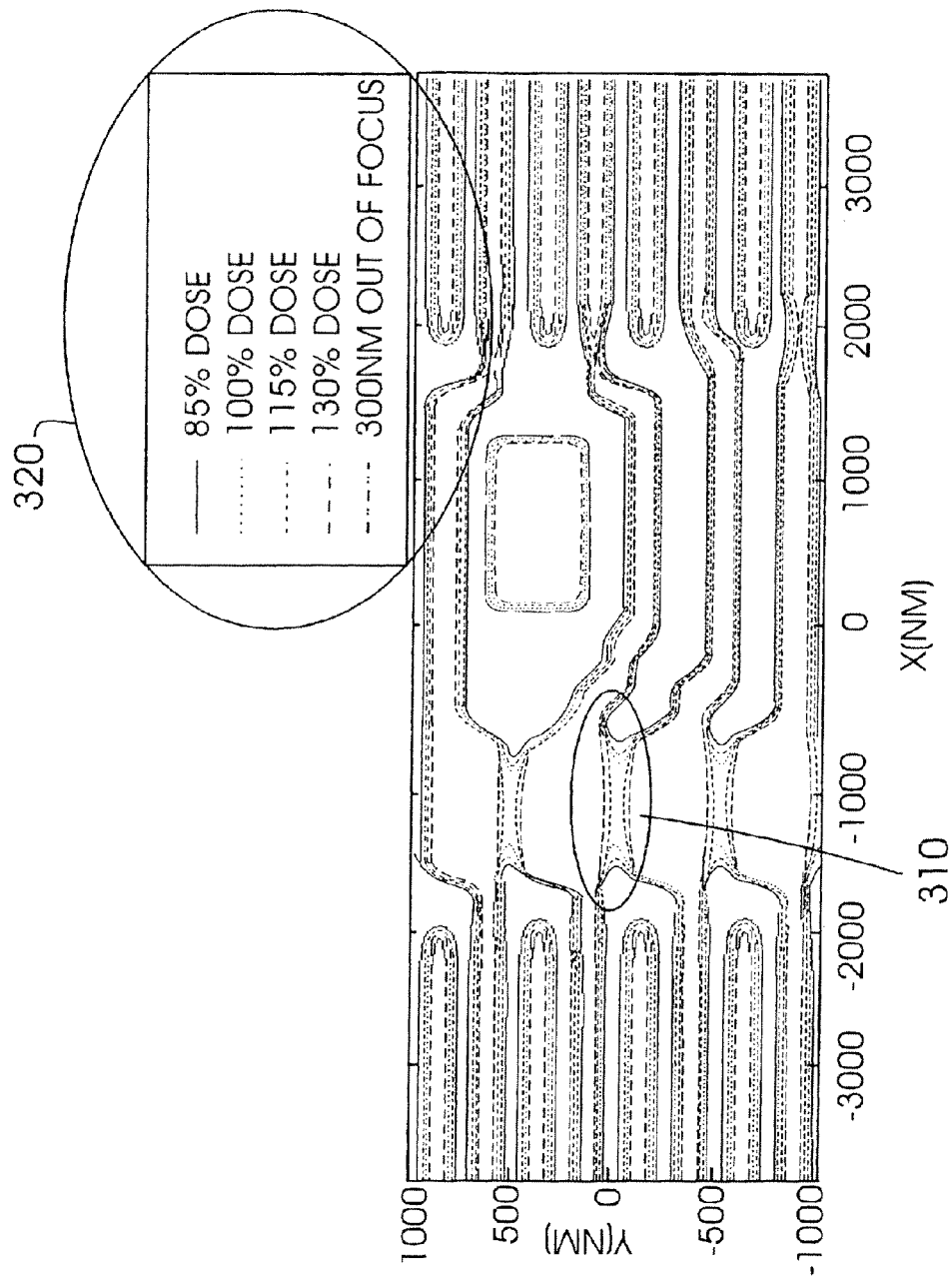
FIG. 3 is an example showing the predicted wafer images of nano circuit layout under different exposure conditions, where the different line styles illustrate various exposure conditions.

On the other hand, focus variations result in decreasing width for both the isolated line and the isolated space whereas the nested line pattern shows a strongly reduced sensitivity to focus. The probability distributions for dose and focus therefore, may be obtained through measurements on the corresponding test pattern over a series of wafers. Example distributions are shown in FIG. 3 for the case of focus variations and similar distributions may be obtained for dose variations. There are other known methodologies for the determination of effective dose and focus parameters. An example is the "Schnitzl methodology" as disclosed by Auschnitt et al. 'Distinguishing dose from defocus for inline process control', Proc. SPIE Vol. 3677, (1999) p. 140. Focus variation may be monitored using the phase focus monitor as described by Brunner et al. 'Quantitative stepper methodology using the focus monitor test mask', SPIE proceedings, Vol. 2197 (1994).

Determination of aberrations on a particular exposure tool in a field location dependent manner may be accomplished through a variety of techniques, for example, see the technique disclosed by N. Farrar, "In situ measurement of lens aberrations", Proc. SPIE Vol. 4000, (2000), p. 19. As aberration levels are typically determined using a finite sampling across the field continuous probability distributions can be established by first establishing discrete distributions. These may be accomplished by establishing equidistant bins across the slit of the exposure field and as well as establishing discrete bins on the aberration axis. These discrete distributions can then be converted to smooth distributions using any of a variety of possible interpolation schemes. In addition, if multiple tools are used in the manufacturing process each tool's contribution may be added, weighted with the probability that it is used to expose wafers. It should be mentioned that other across-slit variations such as illuminator changes may be treated in a similar fashion.

All the process variations previously discussed are intended as examples to illustrate the feasibility of determining probability distributions in accordance with the disclosed methodology. In this regard, each of the above-mentioned references is incorporated herein by reference, as though fully set forth at length.

A further step in defining the worst-case process conditions in accordance with the disclosed methodology is to establish appropriate process conditions that characterize the limits of the process domain. This procedure will be described hereinafter in greater detail.

The various parameters discussed above characterize the performance of a lithographic process. In order to ensure the functionality of the microcircuits produced and estimate expected yields, one establishes a domain inside this parameter space within which the process lies in more than, for example, 9999 out of 10000 cases. For the case of a single parameter, this domain may be easily established by integrating the corresponding probability distribution. The domain where the integrated, normalized probability changes from 0.00005 to 0.99995 defines the domain within which the process runs. For the case of a multi parameter space, additional assumptions have to be made, the simplest one being that the variations in the individual parameters are statistically independent. In this case, the combined probability is simply the product of the probabilities assigned to each one of the individual parameter values. Therefore, a probability distribution may be defined in the combined parameter space. Similar to the one-dimensional case, a process domain is defined by the requirement that only a fraction of the total process lie outside the prescribed domain. In order to not favor a particular process parameter, it is best to define the contour through a fixed value. It is common practice to define the limits of a process based on 3 sigma criteria applied to the combined probabilities, in which case, a boundary may be defined in the parameter space, with a probability of larger than 99.99% that the combined process conditions are within this boundary. Once the boundary has been established, a set of points on this boundary is selected that will be used in the next step of the image enhancement process 1210.

In a simpler approach, the cutoff limits may be chosen based on 3 sigma criteria applied to each individual parameter.

Again referring to FIG. 12, once the worst-case process conditions have been defined in step 1214, the disclosed methodology proceeds to a simulation step 1216. In this regard, step 1216 causes a simulation layout to be generated for a set of worst-case process conditions. That is, once a set of worst-case process conditions is defined, a standard process simulator of the OPC program is used to predict the resulting images on the wafer. A standard image simulation program, for example, is "Prolith", which is commercially available from KLA-Tencor.

For example, it is common practice that the deviation between the desired pattern configuration and the predicted image contour is evaluated on a selected number of points, sometimes referred to as evaluation points. The position of the predicted image relative to the desired image may be expressed as a placement error. There will be a set of placement errors corresponding to each one of the various process conditions simulated in this step. Once all conditions have been evaluated, the resulting edge placement errors may be analyzed in various ways, the simplest case being the evaluation of minimum and maximum edge placement errors. An example of such an evaluation is shown in FIG. 3, where an image feature, such as the image feature 310, is examined under a table 320 of different dose factors.

In this case, the set of simulated worst-case conditions is kept simple in order to illustrate the principle. The conditions displayed correspond to worst-case scenarios of 85% of nominal dose and 0 focus, and 130% of nominal exposure dose and 0 focus as well as 100% of nominal dose and 300 nm defocus. The resulting image contours, are displayed in FIG. 3. Based on these contours, one may calculate an edge placement error, essentially the difference between the desired location as indicated by the original design and the actual location as indicated by one of the contours.

Once the layout has been simulated under a set of worst case process conditions, the next step in the disclosed methodology is defining one or more metrics for criticality which occurs at a command step 1218.

In accordance with the methodology proposed in this disclosure, a metric is derived from the edge placement error. The purpose of this metric is to establish a gauge that allows a separation of acceptable versus failing layouts. The following provides an overview of process criticality metrics.

In one example, process criticality is decided on the size of the edge placement error relative to critical dimensions of the layout. An example is shown in the schematic FIGS. 4A-B. In this regard, in FIG. 4A a first configuration example is illustrated of a layout 410, where facing edges (413 and 415) of two wide shapes, indicated generally at 412 and 414 respectively, are separated by a relatively narrow space indicated generally at 420. Also shown in this layout is an evaluation point 430, marked by a solid circle at the edge of the desired layout 410. A double arrow indicates the maximum deviation of the image contour found through evaluation of the worst-case process conditions. We define the metric of process criticality as the ratio of the maximum edge movement (indicated by the length of the double arrow 431 relative to the smaller one of the two line length 432 and 433.). The ratio of the length of the double arrow 431 relative to the narrow space 420 (represented by line 432) results in the larger numerical value of the process criticality metric. This is the numerical representation of the fact that bridging of the space 420 is the most prominent failure mechanism in the layout scenario shown in FIG. 4A.

Figure 4A:
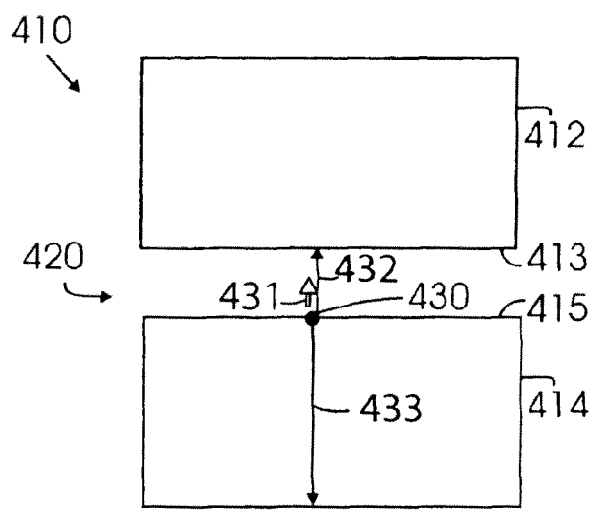
FIG. 4A shows a nano-circuit layout where two wide features are separated by a relatively narrow space.
Figure 4B:
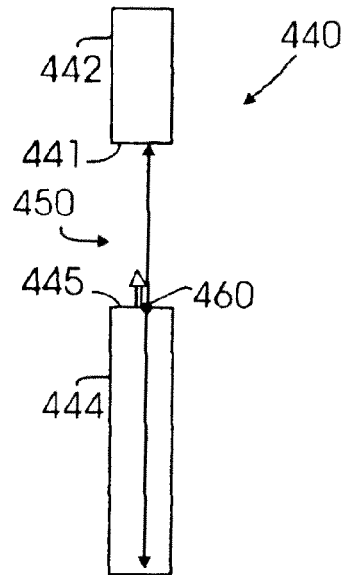
FIG. 4B shows a nano-circuit layout with a line feature facing another line across a gap significantly larger than the gap illustrated in FIG. 4A.

The configuration in FIG. 4B illustrates a layout 440 where the line ends 441 of line 442 is facing another line end 445 of line 444 across a significantly larger gap 450 than shown in the first configuration illustrated in FIG. 4A. Similar to the first configuration of FIG. 4A, an evaluation point is indicated via a solid circle 460 at the line end 445 of line 444. We assume that process failure occurs when the resulting contours on the opposing edges merge together. It is therefore apparent, that the same amount of edge movement depicted in two configurations illustrated in FIGS. 4A and 4B has a drastically larger impact in the first configuration (FIG. 4A) than it does in the second configuration (FIG. 4B). The relevant parameter in this case is the ratio of the edge movement relative to the distance between the opposing layout edges 441 and 445.

While this example simply uses intra-level metrics, an alternative is the use of interlevel metrics. Another example, similar to FIG. 4B, but with an added contact 512 positioned in a different processing layer, results in the configuration 510 shown in FIG. 5. In this scenario, the consequence of not properly overlapping the contact 512 and line end is to cause loss of electrical continuity. As a result, the critical dimension is no longer the distance been the line end 441 and line end 445. Instead, it is the distance between edge 445 at the end of the line 444 and the upper edge of the contact 512. Therefore, the same edge displacement now is significantly more critical, however, with respect to another failure criterion.

Figure 6:
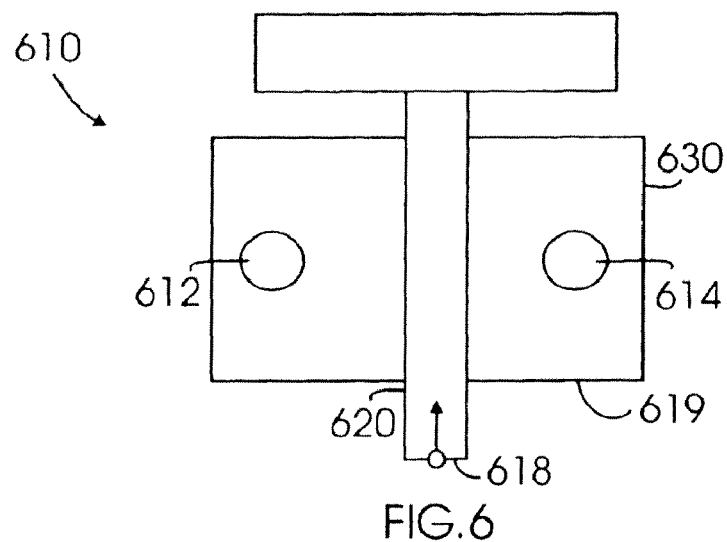
FIG. 6 shows a nano-circuit layout consisting of an active area crossed by a gate and source and drain contacts.

The following example exhibits a case where, as we will see later, potential fixes to the problem may not necessarily be performed on the layer in question. FIG. 6. illustrates a basic device 610 with site geometry consisting of an active area 630 with two contacts for a source region 612 and a drain region 614 and a gate 620 in between. Failure in this scenario occurs when the line end 618 of line 620 marked with a circle, no longer covers the active area in which case the leakage current of the device drastically increases. Therefore, the critical dimension is the distance between the gate line end 618 and the border 619 of the active area 630.

Figure 7:
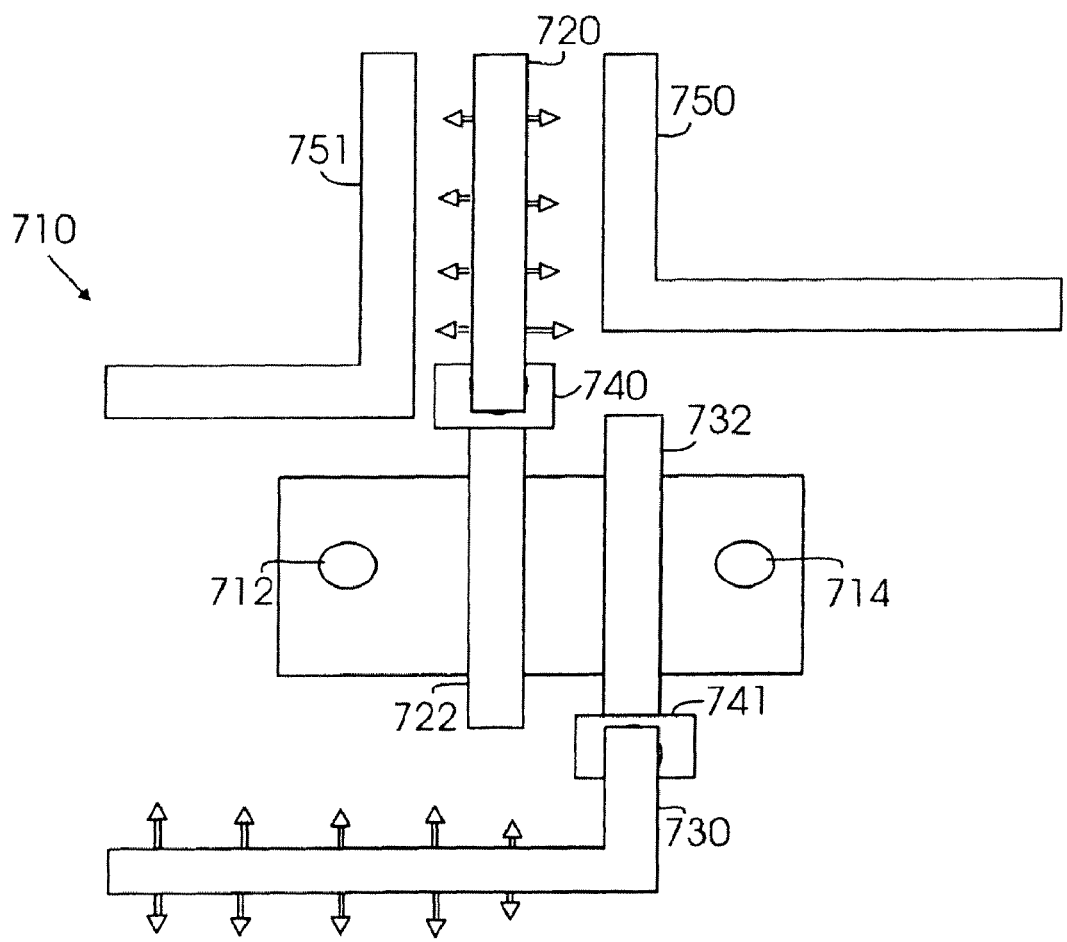
FIG. 7 is a simulated nano-circuit layout with a large number of evaluation points.
Figure 8:
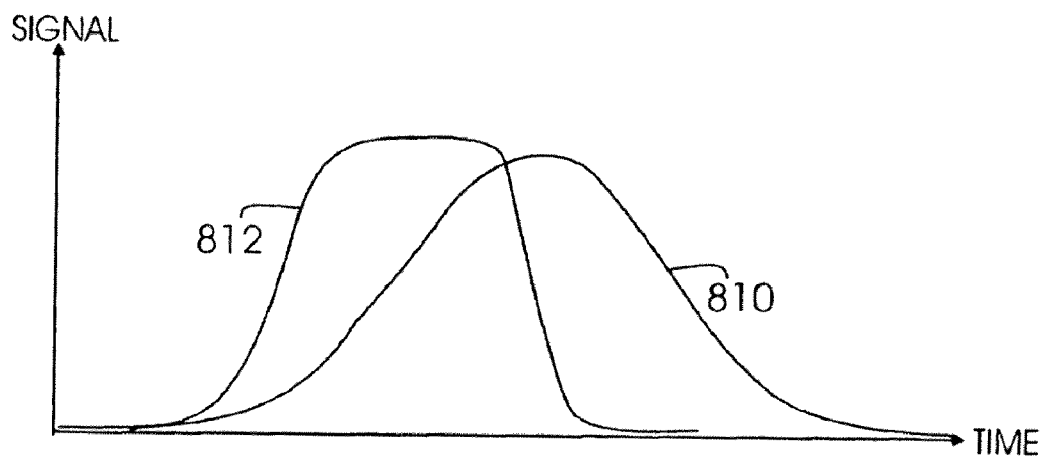
FIG. 8 is a timing diagram for the nano-circuit layout of FIG. 7.

The last example that will be discussed highlights two other potential approaches to creating process metrics: 1) the use of information from a large number of evaluation points and 2) the use of electrical characteristics for the creation of process metrics. In this scenario, as best seen in FIG. 7, a proposed circuit layout 710 would cause current to pass from a source 712 to a drain 714 only when a pair of gates, indicated generally at 722 and 732 respectively, are open simultaneously. The signal is being delivered through two metal wires 720 and 730 respectively, which contact the gates at the gate pads 740 and 741 through a contact (not shown). As is depicted in the figure the metal connection 720 has two other metal lines in close proximity (750 and 751). On the other hand the metal wire 730 has no neighboring lines and is mostly an isolated wire. Due to the fact that the latter connection is largely an isolated wire it exhibits a large worst-case process variation (caused for example by defocus errors) over a multitude of evaluation points. On the other hand the nested wire 720 exhibits significantly smaller focus driven process variations. We further neglect capacitive coupling and assume that the signal delay is entirely caused by resistivity variations. The total signal delay is determined by the size of the process variation added over all the evaluation points. Therefore, there is a larger spread in the signal 810 arrival time for the second gate 732 than the signal 812 for the first gate 722 as is shown in FIG. 8. In particular, a large spread is observed for long delays caused by high resistivity, i.e narrow lines. Failure occurs if in a large enough fraction of the cases, signal 810 and signal 812, intended to arrive at the same time, no longer do so. This circuit therefore no longer performs its proper function. In this particular case the process metric is established by integrating over a large number of evaluation points and the metric involves an electrical characteristic such as the signal delay due to resistivity.

Once a metric has been established in step 1218, which allows a separation of acceptable layouts as opposed to failing or unacceptable layouts, the process 1210 now provides a criteria that allows identification of those layouts that need to be modified at step 1220. In the most common case, a simple threshold function may be used. A particular cell will be marked for example, if the value of the process metric lies above a certain threshold. Alternatively, the cell may be marked if the metric chosen lies outside a certain range defined by the end user. To improve the possibility of creating the correct fixes, as described in the next step, several different metrics may be used simultaneously with different evaluation methods applied to each one of them. The cells exhibiting layouts with flagged features may be stored for further correction. A report may be created summarizing the various failures. Several metrics may be used simultaneously.

Figure 9A:
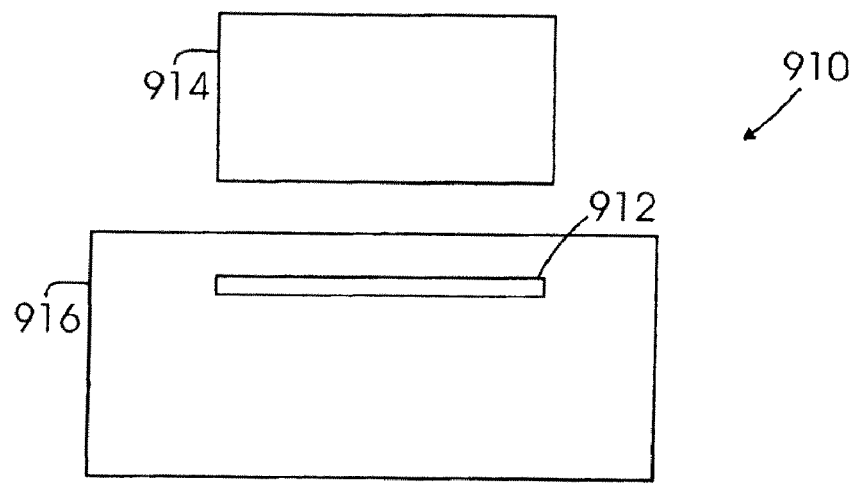
FIG. 9A shows a nano-circuit layout similar to the layout illustrated in FIG. 4A, but with an added sub-resolution assist feature.

We examine a layout 910, which consists of two elements 914 and 916 respectively as best seen in FIG. 9A and which has been flagged due to an issue with the minimum space. The type of metric that caused the flag provides the necessary indication that process sensitivity issues of the minimum space are responsible for this scenario being flagged.

In this scenario one may choose to add sub resolution assist feature 912 to the configuration layout 910. Sub resolution assist features are known in the field as a means to reduce the sensitivity to process variations. The name 'sub resolution' refers to the fact that they are small enough such as to not print on the wafer. At the same time however, they modify the aerial image characteristics such as to provide improved process performance. The particular type of assist features used in this scenario are called clear assists, i.e part of the solid shape is being removed.

Usage of sub-resolution assist features is the preferred approach if applicable, as it provides improved process stability without tradeoffs in the OPC performance. It should be mentioned that of course an alternative solution is to add assist features on all features within the layout irrespective of whether or not the layout has been flagged as being process critical. While a perfectly suitable solution it does have one major drawback in that it unnecessarily increases the data volumes for mask builds as the assist features may not be required in all instances. The solution proposed here only adds resolution enhancement techniques if they are needed and therefore keeps data size increases to a minimum.

Figure 9B:
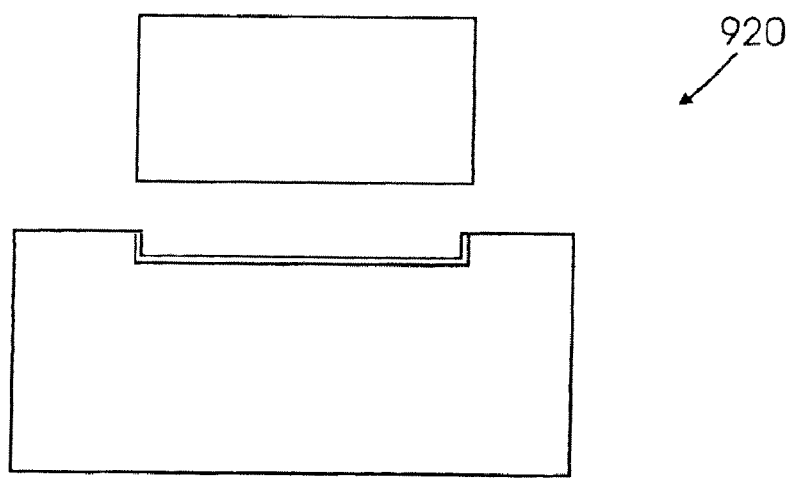
FIG. 9B shows a nano-circuit layout similar to the layout of FIG. 4A, illustrating an alternative repair approach to that shown in FIG. 9A.

An alternative to adding resolution enhancement techniques is to change the layout itself. In this particular scenario, one may widen the space. This resolves process issues in two ways. First, the increased spaces provide a better process window and, therefore, smaller variations, and second, due to the increased critical dimension, the same variations result in smaller critical parameters. This alternative is indicated in an alternative layout 920 as shown in FIG. 9B.

Figure 5:
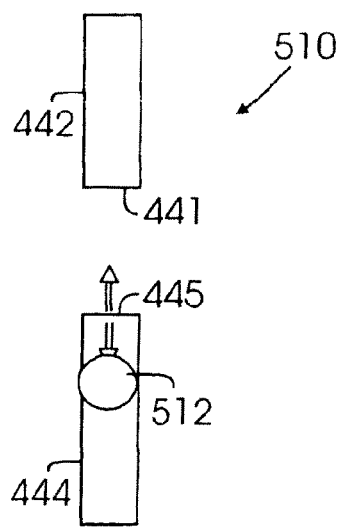
FIG. 5 shows a nano-circuit layout similar to the one in FIG. 4B, but with a contact feature added to the layout.
Figures 10A, 10B, 10C:
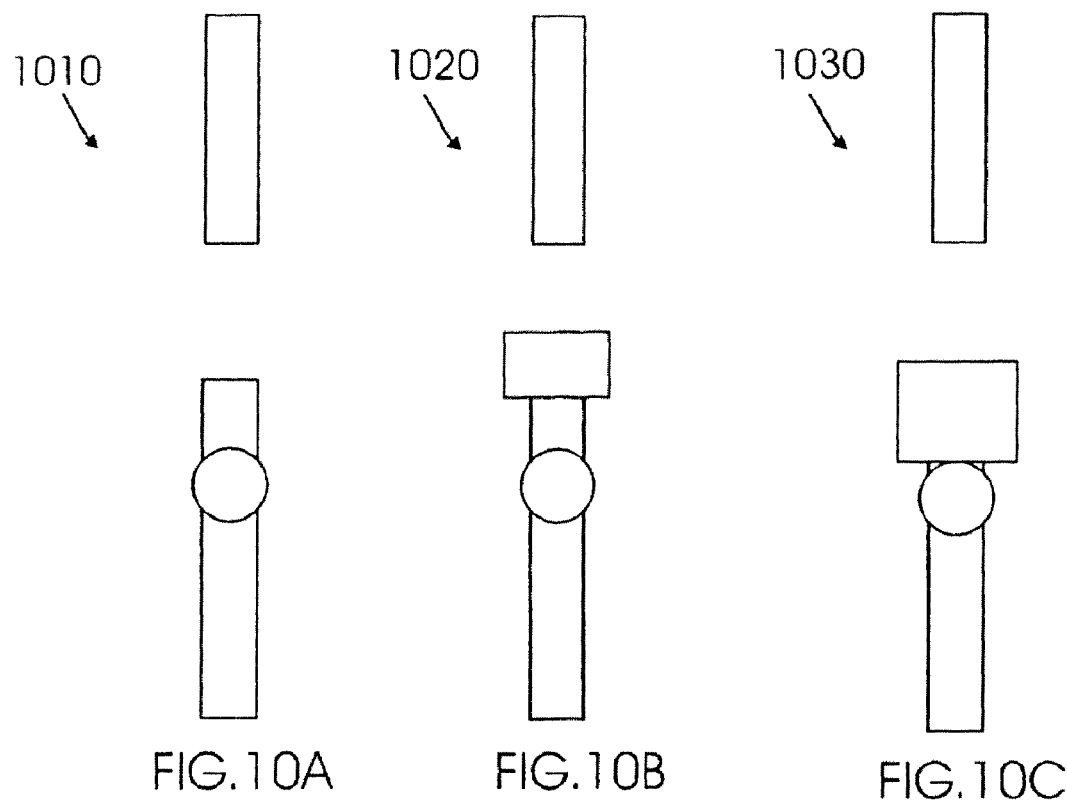
FIG. 10A-C show nano-circuit layouts similar to FIG. 5 where varying approaches to correct a line end have been implemented.
Figure 11:
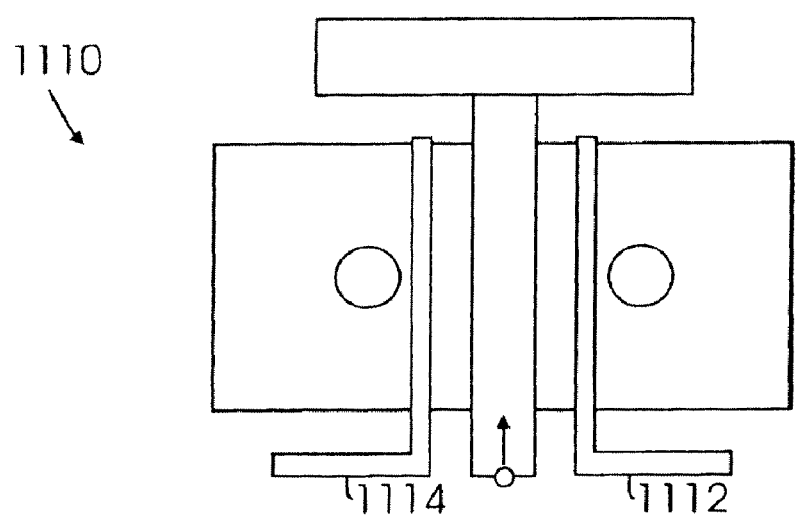
FIG. 11 shows a nano circuit layout similar to FIG. 6 where a repair algorithm has added sub-resolution assist features.

Consider now a layout scenario similar to that shown in FIG. 5. In this regard, a site 1010 (FIG. 10A) is assumed to have been flagged due to the fact that the variation in the line end is too large relative to the distance between the line end and the contact. It is further assumed that the layout 1010 (FIG. 10A) has been corrected using a standard OPC procedure, which would add hammerheads and provide some line end extension to provide a corrected layout, such as the layout 1020 illustrated in FIG. 10B. Both methods compensate for the process induced line end fore shortening. Therefore, the conclusion is that standard OPC procedures do not provide sufficient compensation. OPC solutions for line end fore-shortening are not unique and may depend on a variety of settings within the OPC program. It is this non-uniqueness of the OPC solution that provides the means to optimize the solution in this case. Optimized solutions 1030 and 1110 are illustrated in FIG. 10C and FIG. 11 respectively, which consist of increasing the size of the hammerhead, either by widening it (in the direction perpendicular to the line as shown in FIG. 11) or by increasing its length (in the direction of the line as shown in FIG. 10C). Both approaches reduce the sensitivity of the line end to process variations, possibly at the cost of having the resulting line end looking slightly bulbous at the end.

In the layout scenario illustrated in FIG. 7, we have encountered a common problem area for a gate line end crossing the edge of the active area. The variation on the line end is found to be too large relative to the designed distance and, therefore, exposes the device to potential failure due to increased leakage. One option in this scenario is to locally reduce the width of the active area, although this may reduce the forward current of the device (since the width of the device has been reduced). Alternatively sub-resolution assist features 1112 and 1114 may be added in a fashion similar to that indicated in FIG. 11. The L-shaped assist features added to this layout 1110 provide improved process stability for the line end as they provide a more nested environment to the line end.

Considering again the layout shown in FIG. 7. As discussed above, the site may have been flagged due to a timing issue. The variations in the metal lines leading up to the two gates result in an offset between the signals arriving at gate 722 and 732 which may be sufficiently large as to render the device inoperable. As we have seen in this case, the narrowing of one of the lines due to process variations causes large delays in the signal. As a result, one may choose to widen the metal lines 730. This not only reduces the amount of variation, but it also compensates for the average shift in the arrival times of the signals to gate 722 and 732.

Once problematic layouts have been identified in step 1220, the process continues to a call step 1222, that calls a correction process 1410, which is a key step to continue the data preparation process and avoid undue delays in the mask tapeout. The correction process 1410 (FIG. 14) will be described hereinafter in greater detail.

The correction routine will be called if a certain layout has been flagged as a process critical feature. The correction routine then moves on to determine which one of a multitude of process criticality metrics has flagged the particular layout sample in question. For the purpose of this example we assume that there are two types of process criticality issues. One set encompasses metrics, which only use intra level criteria, and a second set that uses interlevel criteria. The first set in our example corresponds to layout scenarios similar to those depicted in FIGS. 4A and 4B. The second set encompasses layout scenarios corresponding to FIGS. 5 and 6. Assuming that the site has been flagged for a large value of the intra level process metric, the correction algorithm then proceeds to analyze whether or not the length of the polygon segment flagged is larger than or smaller than approximately 400 nm. For segments larger than this length usage of sub resolution assist features is a viable technique to reduce the process criticality metric. Usage of sub resolution assist features for segment lengths of less than 400 nm are fairly inefficient in terms of reducing process variations and, thus, the process criticality is reduced by moving the target design edge. As indicated above this contributes to reductions in process criticality in two ways. For one it increases the critical dimension (which is in the denominator of the process criticality) and secondly, it also decreases the amount of process variations. Turning now to the right side of the diagram, we now assume that the layout has been flagged due to a contact to line end issue (see FIG. 5). In this case increasing the size of the hammerhead is an acceptable solution even though it may result in a slightly 'bulbous' looking line end. The bulbous shape on a metal level is not an issue. For the case of a gate (see FIG. 6) we assume that a different correction strategy may be deployed which uses L-shaped assist features to provide a smaller value of the process critical metric. It is to be understood that the example shown here is to illustrate a particular implementation of the repair algorithm and alternative implementations are possible. In the following we will discuss in some more detail the resulting geometries.

To verify if the correction process created the desired result, the process 1210 at step 1226 returns to step 1220 and proceeds as previously described. This process is iterative and concludes at an end step 1290 when no further corrections have been flagged. In this regard, the correcting step 1222 is completed a sufficient number of times to effect an acceptable nano-circuit layout design.

Figure 14:
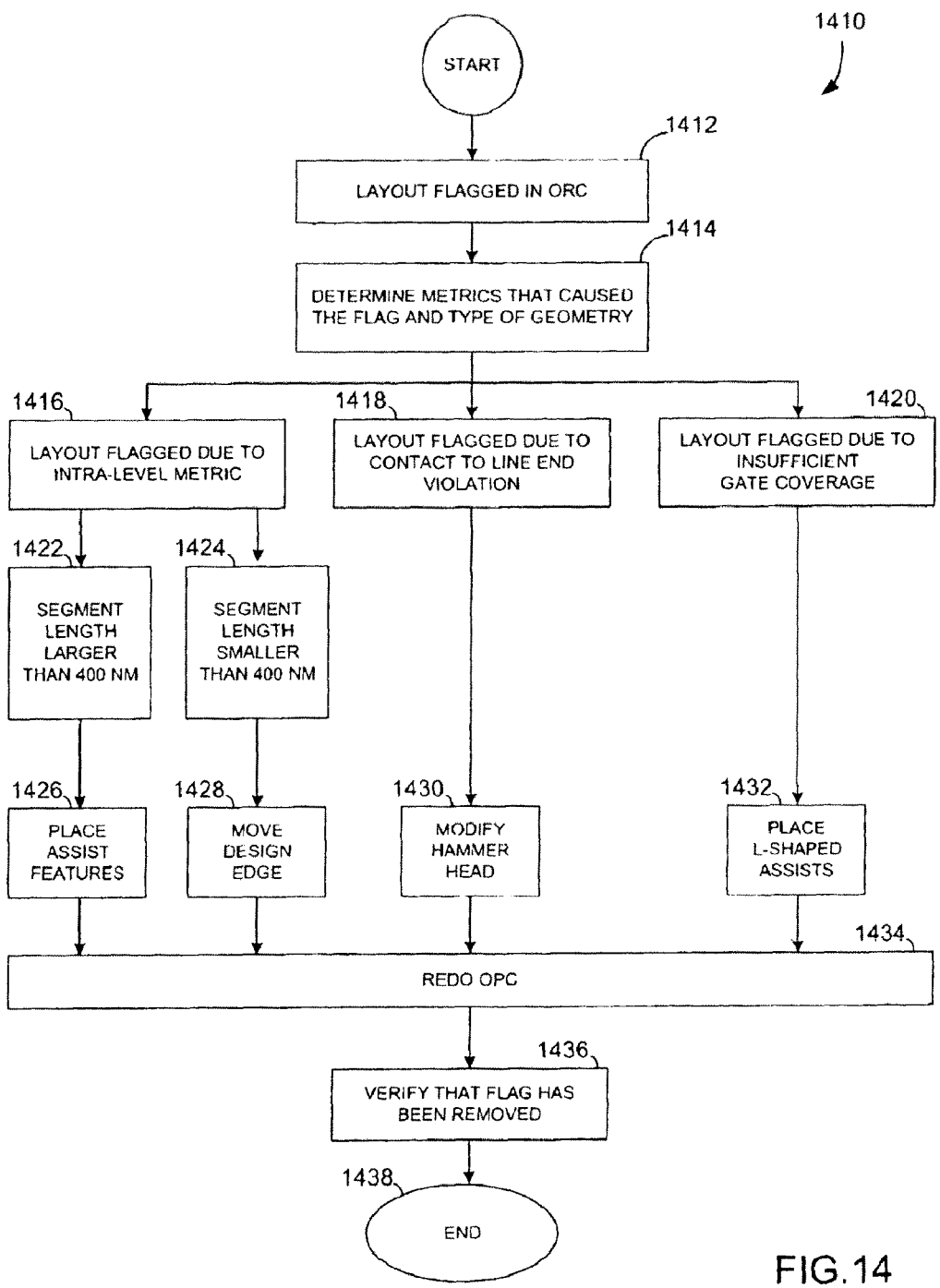
FIG. 14 is a flow diagram illustrating the steps of the correction process initiated from a call step in FIG. 12.

Considering now the correction process 1410 in greater detail with reference to FIG. 14, the correction process 1410 begins from a start position in response to the call step 1222 (FIG. 12) and immediately advances to a layout step 1412, which represents that a layout has been flagged in the optical rules checking.

Next, the process proceeds to a check step 1414 that determines the metric(s) that caused the flag and the type of geometry involved. In this regard, the process may advance to one of three determination paths: step 1416 where the layout flagged was due to an intra-level metric; step 1418 where the layout flagged was due to a contact to line end violation; and step 1420 where the layout flagged was due to insufficient gate coverage. The continuations of each of these determination paths will now be considered in detail.

From step 1416, the correction process 1410 continues to one of two further check steps: step 1422 where the segment length is larger than 400 nanometers; and step 1424 where the segment length is smaller than 400 nanometers. In the first instance, where the length is larger than 400 nanometers, the process continues to step 1426 to place an assist feature. In the second case, where the length is smaller than 400 nanometers, the process continues to a command step 1428 that executes a move design edge. Both steps 1426 and 1428 proceed to an execute step 1434 which causes an optical proximity correction to be redone.

From step 1418, the process proceeds to a command step 1430 to modify a hammerhead. After execution of this step, the process goes to the execute step 1434.

From step 1420, the process advances to a command step 1432 to place an L-shaped assist. After execution of this step, the process proceeds to the execute step 1434.

After executing the repeat the optical proximity correction step at 1434, the correction process 1410 then advances to a verification step 1436 to verify that the previously detected flag has now been removed. The process then proceeds to an end command at 1438.

In summary then, a preferred methodology for detecting and resolving yield issues associated with layout configurations that may lead to reduced yields has been disclosed. The method encompasses the steps of: 1) defining a set of worst case process conditions; 2) simulating a post optical proximity correction (OPC) layout for a plurality of process conditions; 3) evaluating the error in a predicted wafer image relative to a desired target; 4) creating a metric for process criticality based on predicted edge movement as well as critical dimensions relevant to the image geometry; and once the foregoing steps have been performed, the process critical features may be flagged and subsequently fixed by 5) selecting layout geometries based on the metric developed in step 4); and finally 6) performing modifications to the layout, either pre or post OPC to improve circuit layout performance in an automated fashion.

Considering now the computer program product 110, in greater detail with reference to FIGS. 1 and 12, the computer program product 110 is a computer usable medium that has encoded thereon computer readable codes. The computer readable codes enable a user, via the CAD system 10, to cause a process critical layout design implemented in a lithographic process to be corrected. In this regard, the computer program product 110 has encoded thereon computer readable program code that causes the computer 30 to characterize the influence of individual worst case process variations on a simulated nano-circuit layout design to define process criticality in a lithographic process and then causes the computer 30 to automatically locate and correct each individual failure location in the simulated nano-circuit layout design in response to at least one feature on the simulated nano-circuit layout design being flagged as being in need of correction.

More particularly, the computer readable program code encoded on the disc 110 causes the computer 30 to establish a methodology that determines a set of worst case process variations affecting the performance of the lithographic process and then causes the computer 30 to apply a base line metric on the simulated nano-circuit layout design.

More specifically, the computer readable code causes the computer 30 to define a first approximation of a lithographic process having a plurality of nominal conditions, wherein each of the nominal conditions is subject to a process variation and then to determine a probability distribution for each individual one of the nominal conditions during a predefined nano-circuit manufacturing process.

The computer readable code further causes the computer 30 to predict whether any individual one of the worst case process variations will detrimentally influence the performance of the lithographic process during a predefined nano-circuit manufacturing process. In this regard, the computer 30 derives the base line metric in response to the computer 30 predicting whether any individual one of the worst case process variations detrimentally influences the performance of the lithographic process during the predefined nano-circuit manufacturing process.

In the preferred embodiment, the computer readable code has been described as being encoded on a disc 110 that can be entered into the computer memory 40 by the disc drive 22, which reads and transfers the code under computer control. However, it is contemplated that the code could be entered directly from the keyboard 20 or any other input device that is capable of communication with the computer 30. Therefore, while a particular embodiment of the present invention has been disclosed, it is to be understood that various different modifications are possible and are contemplated within the true spirit and scope of the appended claims. There is no intention, therefore, of limitations to the exact abstract or disclosure herein presented.

I claim:

1. A computer-aided design (CAD) system configured for correcting a circuit design layout containing a process critical feature, comprising:
    a processor;
    a memory connected to the processor; and
    a non-transitory computer usable medium having instructions embedded therein, the instructions configured to cause the processor to perform the operations of:
    evaluating a detected error in the circuit design layout; said evaluating comprising:
        simulating the process critical feature of the circuit design layout within the limits of a process domain, wherein the process domain is defined by:
            determining a range of process variations of a plurality of nominal process conditions for a lithographic process;
            determining a probability distribution of the range of process variations of the plurality of nominal process conditions during a predefined circuit manufacturing process using the determined range, wherein the probability distribution is determined through test pattern measurements from the predefined manufacturing process; and
            defining the process domain, wherein the process domain defines limits of the range of process variations of the plurality of nominal process conditions and the limits are respectively based on determined probability distributions of the nominal process conditions;
        said evaluating further comprising detecting an error in the circuit design layout based on results from the simulation of the process critical feature;
    the instructions further configured to cause the processor to perform the operations of:
    creating a metric for process criticality based on a predicted edge movement and a resulting deviation in an electrical performance characteristic derived from the detected error;
    selecting a layout geometry based on the metric to determine whether the layout geometry requires modification to improve an electrical performance characteristic; and
    automatically performing a modification to the geometry layout to improve the electrical performance characteristic.

2. The computer-aided design system of claim 1, wherein the limits comprise ±3 sigma of the process variations.

3. The computer-aided design system of claim 1, wherein the process domain comprises a normalized probability changes from 0.00005 to 0.99995 that defines the process domain within which the process runs.

4. The computer-aided design system of claim 1, wherein the metric defines an acceptable range of a characteristic of the process critical feature.

5. The computer-aided design system of claim 4, wherein the characteristic comprises a dimensional characteristic or an electrical characteristic of the circuit feature.

6. The computer-aided design system of claim 5, wherein the dimensional characteristic comprises a maximum edge movement divided by a next nearest neighbor.

7. The computer-aided design system of claim 5, wherein the dimensional characteristic comprises an edge movement relative to at least one interlevel design rule critical parameter.

8. The computer-aided design system of claim 5, wherein the electrical characteristic comprises a resistivity, a current value, or a signal delay value of the circuit feature.

9. A computer-implemented method of correcting a circuit design layout containing a process critical feature, the method comprising:
    evaluating, with a computer, a detected error in the circuit design layout; said evaluating comprising:
        simulating, with a computer, the process critical feature of the circuit design layout within the limits of a process domain, wherein the process domain is defined by:
            determining, with a computer, a range of process variations of a plurality of nominal process conditions for a lithographic process;
            determining, with a computer, a probability distribution of the range of process variations of the plurality of nominal process conditions during a predefined circuit manufacturing process using the determined range, wherein the probability distribution is determined through test pattern measurements from the predefined manufacturing process; and
            defining the process domain, wherein the process domain defines limits of the range of process variations of the plurality of nominal process conditions and the limits are respectively based on determined probability distributions of the nominal process conditions;
        said evaluating further comprising detecting, with a computer, an error in the circuit design layout based on results from the simulation of the process critical feature;
    the computer-implemented method further comprising:
    creating a metric for process criticality based on a predicted edge movement and a resulting deviation in an electrical performance characteristic derived from the detected error;
    selecting, with a computer, a layout geometry based on the metric to determine whether the layout geometry requires modification to improve an electrical performance characteristic; and automatically performing a modification to the geometry layout to improve the electrical performance characteristic.

10. The computer-implemented method of claim 9, wherein the metric defines an acceptable range of a characteristic of the process critical feature.

11. The computer-implemented method of claim 10, wherein the characteristic comprises a dimensional characteristic or an electrical characteristic of the circuit feature.

12. The computer-implemented method of claim 11, wherein the dimensional characteristic comprises a maximum edge movement divided by a next nearest neighbor.

13. The computer-implemented method of claim 11, wherein the dimensional characteristic comprises an edge movement relative to at least one interlevel design rule critical parameter.

14. The computer-implemented method of claim 11, wherein the electrical characteristic comprises a resistivity, a current value, or a signal delay value of the circuit feature.

15. A non-transitory computer usable medium having instructions embedded therein, the instructions configured to cause a processor to perform a method of correcting a circuit design layout containing a process critical feature, the processor performing the method by performing the operations of:
  evaluating a detected error in the circuit design layout; said evaluating comprising:
    simulating the process critical feature of the circuit design layout within the limits of a process domain, wherein the process domain is defined by:
      determining a range of process variations of a plurality of nominal process conditions for a lithographic process;
      determining a probability distribution of the range of process variations of the plurality of nominal process conditions during a predefined circuit manufacturing process using the determined range, wherein the probability distribution is determined through test pattern measurements from the predefined manufacturing process; and
      defining the process domain, wherein the process domain defines limits of the range of process variations of the plurality of nominal process conditions and the limits are respectively based on determined probability distributions of the nominal process conditions;
    said evaluating further comprising detecting an error in the circuit design layout based on results from the simulation of the process critical feature;
  the instructions further configured to cause the processor to perform the operations of:
  creating a metric for process criticality based on a predicted edge movement and a resulting deviation in an electrical performance characteristic derived from the detected error;
  selecting a layout geometry based on the metric to determine whether the layout geometry requires modification to improve an electrical performance characteristic; and
  automatically performing a modification to the geometry layout to improve the electrical performance characteristic.

16. The non-transitory computer usable medium of claim 15, wherein the metric defines an acceptable range of a characteristic of the process critical feature.

17. The non-transitory computer usable medium of claim 16, wherein the characteristic comprises a dimensional characteristic or an electrical characteristic of the circuit feature.

18. The non-transitory computer usable medium of claim 17, wherein the dimensional characteristic comprises a maximum edge movement divided by a next nearest neighbor.

19. The non-transitory computer usable medium of claim 17, wherein the dimensional characteristic comprises an edge movement relative to at least one interlevel design rule critical parameter.

20. The non-transitory computer usable medium of claim 17, wherein the electrical characteristic comprises a resistivity, a current value, or a signal delay value of the circuit feature.

* * * * *